United States Patent
Zhang et al.

(10) Patent No.: US 6,832,007 B1
(45) Date of Patent: Dec. 14, 2004

(54) METHOD AND SYSTEM FOR COMPENSATING FOR SCALING ARTIFACTS IN MIXED RASTER CONTENT (MRC) REPRESENTATIONS

(75) Inventors: Yeqing Zhang, Penfield, NY (US); Martin E. Banton, Fairport, NY (US); James R. Low, Rochester, NY (US); Steven J. Harrington, Webster, NY (US); William A. Fuss, Rochester, NY (US)

(73) Assignee: Xerox Corporation, Stamford, CT (US)

(*) Notice: Subject to any disclaimer, the term of this patent is extended or adjusted under 35 U.S.C. 154(b) by 638 days.

(21) Appl. No.: 09/717,748

(22) Filed: Nov. 21, 2000

(51) Int. Cl.[7] .................................................. G06K 9/42
(52) U.S. Cl. ....................... 382/257; 382/233; 382/275; 382/298; 348/666; 358/1.2; 358/3.26
(58) Field of Search ................................ 382/100, 164, 382/257, 270, 308, 173, 176, 233, 239, 298, 275; 358/500, 501, 502, 518, 519, 520, 530, 534, 448, 449, 1.2; 348/746, 747

(56) References Cited

U.S. PATENT DOCUMENTS

| | | | | |
|---|---|---|---|---|
| 5,247,348 A | * | 9/1993 | Israelsen et al. | 725/67 |
| 5,272,764 A | * | 12/1993 | Bloomberg et al. | 382/164 |
| 5,303,313 A | * | 4/1994 | Mark et al. | 382/235 |
| 5,377,024 A | * | 12/1994 | Dillinger | 358/502 |
| 5,949,964 A | * | 9/1999 | Clouthier et al. | 358/3.06 |
| 6,542,173 B1 | * | 4/2003 | Buckley | 345/841 |

* cited by examiner

*Primary Examiner*—Bhavesh M. Mehta
*Assistant Examiner*—Abolfazl Tabatabai
(74) *Attorney, Agent, or Firm*—Fay, Sharpe, Fagan, Minnich & McKee, LLP

(57) ABSTRACT

An image processing method and system compensates for artifacts in scaling operations of mixed raster content data representations. In such data representations, a document is segmented into data portions generally segregated by data types. At least one of the segments is dilated so that upon scaling reconstruction, there are additional pixels available for interpolation operations, thereby avoiding artifacts caused by discontinuity.

19 Claims, 14 Drawing Sheets

```
20 20                              ORIGINAL IMAGE
 1  255 255 255 255 255 255 255 255 255 255 255 255 255 255 255 255 255 255 255 255
 2  255 255 255 255 255 255 255 255 255 255 255 255 255 255 255 255 255 255 255 255
 3  255 255 255 255 255 255 255 255 255 255 255 255 255 255 255 255 255 255 255 255
 4  255 255 255 255 255 255 255 255 255 255 255 255 255 255 255 255 255 255 255 255
 5  255 255 255 255 255 255 255 255 255 255 255 255 255 255 255 255 255 255 255 255
 6  255 255 255 255 255   0   0   0   0   0   0   0   0   0 255 255 255 255 255 255
 7  255 255 255 255 255   0   0   0   0   0   0   0   0   0 255 255 255 255 255 255
 8  255 255 255 255 255   0   0   0   0   0   0   0   0   0 255 255 255 255 255 255
 9  255 255 255 255 255   0   0   0   0   0   0   0   0   0 255 255 255 255 255 255
10  255 255 255 255 255   0   0   0   0   0   0   0   0   0 255 255 255 255 255 255
11  255 255 255 255 255   0   0   0   0   0   0   0   0   0 255 255 255 255 255 255
12  255 255 255 255 255   0   0   0   0   0   0   0   0   0 255 255 255 255 255 255
13  255 255 255 255 255   0   0   0   0   0   0   0   0   0 255 255 255 255 255 255
14  255 255 255 255 255   0   0   0   0   0   0   0   0   0 255 255 255 255 255 255
15  255 255 255 255 255 255 255 255 255 255 255 255 255 255 255 255 255 255 255 255
16  255 255 255 255 255 255 255 255 255 255 255 255 255 255 255 255 255 255 255 255
17  255 255 255 255 255 255 255 255 255 255 255 255 255 255 255 255 255 255 255 255
18  255 255 255 255 255 255 255 255 255 255 255 255 255 255 255 255 255 255 255 255
19  255 255 255 255 255 255 255 255 255 255 255 255 255 255 255 255 255 255 255 255
20  255 255 255 255 255 255 255 255 255 255 255 255 255 255 255 255 255 255 255 255
     1   2   3   4   5   6   7   8   9  10  11  12  13  14  15  16  17  18  19  20
```

*FIG. 3(a)*

20 20                SCALE BY 1/2 X 2, WITH NEAREST NEIGHBOR

20 20   SCALE BY 1/2 X 2, WITH LINEAR INTERPOLATION

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 255 | 255 | 255 | 255 | 255 | 255 | 255 | 255 | 255 | 255 | 255 | 255 | 255 | 255 | 255 | 255 | 255 | 255 | 255 | 255 |
| 2 | 255 | 255 | 255 | 255 | 255 | 255 | 255 | 255 | 255 | 255 | 255 | 255 | 255 | 255 | 255 | 255 | 255 | 255 | 255 | 255 |
| 3 | 255 | 255 | 255 | 255 | 255 | 255 | 255 | 255 | 255 | 255 | 255 | 255 | 255 | 255 | 255 | 255 | 255 | 255 | 255 | 255 |
| 4 | 255 | 255 | 255 | 255 | 255 | 255 | 255 | 255 | 255 | 255 | 255 | 255 | 255 | 255 | 255 | 255 | 255 | 255 | 255 | 255 |
| 5 | 255 | 255 | 255 | 255 | 255 | 255 | 255 | 255 | 255 | 255 | 255 | 255 | 255 | 255 | 255 | 255 | 255 | 255 | 255 | 255 |
| 6 | 255 | 255 | 255 | 255 | 255 | 156 | 116 | 96 | 96 | 96 | 96 | 96 | 96 | 136 | 255 | 255 | 255 | 255 | 255 | 255 |
| 7 | 255 | 255 | 255 | 255 | 255 | 116 | 60 | 32 | 32 | 32 | 32 | 32 | 32 | 88 | 255 | 255 | 255 | 255 | 255 | 255 |
| 8 | 255 | 255 | 255 | 255 | 255 | 96 | 32 | 0 | 0 | 0 | 0 | 0 | 0 | 64 | 255 | 255 | 255 | 255 | 255 | 255 |
| 9 | 255 | 255 | 255 | 255 | 255 | 96 | 32 | 0 | 0 | 0 | 0 | 0 | 0 | 64 | 255 | 255 | 255 | 255 | 255 | 255 |
| 10 | 255 | 255 | 255 | 255 | 255 | 96 | 32 | 0 | 0 | 0 | 0 | 0 | 0 | 64 | 255 | 255 | 255 | 255 | 255 | 255 |
| 11 | 255 | 255 | 255 | 255 | 255 | 96 | 32 | 0 | 0 | 0 | 0 | 0 | 0 | 64 | 255 | 255 | 255 | 255 | 255 | 255 |
| 12 | 255 | 255 | 255 | 255 | 255 | 96 | 32 | 0 | 0 | 0 | 0 | 0 | 0 | 64 | 255 | 255 | 255 | 255 | 255 | 255 |
| 13 | 255 | 255 | 255 | 255 | 255 | 96 | 32 | 0 | 0 | 0 | 0 | 0 | 0 | 64 | 255 | 255 | 255 | 255 | 255 | 255 |
| 14 | 255 | 255 | 255 | 255 | 255 | 136 | 88 | 64 | 64 | 64 | 64 | 64 | 64 | 112 | 255 | 255 | 255 | 255 | 255 | 255 |
| 15 | 255 | 255 | 255 | 255 | 255 | 255 | 255 | 255 | 255 | 255 | 255 | 255 | 255 | 255 | 255 | 255 | 255 | 255 | 255 | 255 |
| 16 | 255 | 255 | 255 | 255 | 255 | 255 | 255 | 255 | 255 | 255 | 255 | 255 | 255 | 255 | 255 | 255 | 255 | 255 | 255 | 255 |
| 17 | 255 | 255 | 255 | 255 | 255 | 255 | 255 | 255 | 255 | 255 | 255 | 255 | 255 | 255 | 255 | 255 | 255 | 255 | 255 | 255 |
| 18 | 255 | 255 | 255 | 255 | 255 | 255 | 255 | 255 | 255 | 255 | 255 | 255 | 255 | 255 | 255 | 255 | 255 | 255 | 255 | 255 |
| 19 | 255 | 255 | 255 | 255 | 255 | 255 | 255 | 255 | 255 | 255 | 255 | 255 | 255 | 255 | 255 | 255 | 255 | 255 | 255 | 255 |
| 20 | 255 | 255 | 255 | 255 | 255 | 255 | 255 | 255 | 255 | 255 | 255 | 255 | 255 | 255 | 255 | 255 | 255 | 255 | 255 | 255 |

FIG. 3(c)

20 20           DILATE ORIGINAL IMAGE BY 1

|    | 1 | 2 | 3 | 4 | 5 | 6 | 7 | 8 | 9 | 10 | 11 | 12 | 13 | 14 | 15 | 16 | 17 | 18 | 19 | 20 |
|----|---|---|---|---|---|---|---|---|---|----|----|----|----|----|----|----|----|----|----|----|
| 1  | 255 | 255 | 255 | 255 | 255 | 255 | 255 | 255 | 255 | 255 | 255 | 255 | 255 | 255 | 255 | 255 | 255 | 255 | 255 | 255 |
| 2  | 255 | 255 | 255 | 255 | 255 | 255 | 255 | 255 | 255 | 255 | 255 | 255 | 255 | 255 | 255 | 255 | 255 | 255 | 255 | 255 |
| 3  | 255 | 255 | 255 | 255 | 255 | 255 | 255 | 255 | 255 | 255 | 255 | 255 | 255 | 255 | 255 | 255 | 255 | 255 | 255 | 255 |
| 4  | 255 | 255 | 255 | 255 | 255 | 255 | 255 | 255 | 255 | 255 | 255 | 255 | 255 | 255 | 255 | 255 | 255 | 255 | 255 | 255 |
| 5  | 255 | 255 | 255 | 255 | 0 | 0 | 0 | 0 | 0 | 0 | 0 | 0 | 0 | 0 | 0 | 255 | 255 | 255 | 255 | 255 |
| 6  | 255 | 255 | 255 | 255 | 0 | 0 | 0 | 0 | 0 | 0 | 0 | 0 | 0 | 0 | 0 | 255 | 255 | 255 | 255 | 255 |
| 7  | 255 | 255 | 255 | 255 | 0 | 0 | 0 | 0 | 0 | 0 | 0 | 0 | 0 | 0 | 0 | 255 | 255 | 255 | 255 | 255 |
| 8  | 255 | 255 | 255 | 255 | 0 | 0 | 0 | 0 | 0 | 0 | 0 | 0 | 0 | 0 | 0 | 255 | 255 | 255 | 255 | 255 |
| 9  | 255 | 255 | 255 | 255 | 0 | 0 | 0 | 0 | 0 | 0 | 0 | 0 | 0 | 0 | 0 | 255 | 255 | 255 | 255 | 255 |
| 10 | 255 | 255 | 255 | 255 | 0 | 0 | 0 | 0 | 0 | 0 | 0 | 0 | 0 | 0 | 0 | 255 | 255 | 255 | 255 | 255 |
| 11 | 255 | 255 | 255 | 255 | 0 | 0 | 0 | 0 | 0 | 0 | 0 | 0 | 0 | 0 | 0 | 255 | 255 | 255 | 255 | 255 |
| 12 | 255 | 255 | 255 | 255 | 0 | 0 | 0 | 0 | 0 | 0 | 0 | 0 | 0 | 0 | 0 | 255 | 255 | 255 | 255 | 255 |
| 13 | 255 | 255 | 255 | 255 | 0 | 0 | 0 | 0 | 0 | 0 | 0 | 0 | 0 | 0 | 0 | 255 | 255 | 255 | 255 | 255 |
| 14 | 255 | 255 | 255 | 255 | 0 | 0 | 0 | 0 | 0 | 0 | 0 | 0 | 0 | 0 | 0 | 255 | 255 | 255 | 255 | 255 |
| 15 | 255 | 255 | 255 | 255 | 0 | 0 | 0 | 0 | 0 | 0 | 0 | 0 | 0 | 0 | 0 | 255 | 255 | 255 | 255 | 255 |
| 16 | 255 | 255 | 255 | 255 | 255 | 255 | 255 | 255 | 255 | 255 | 255 | 255 | 255 | 255 | 255 | 255 | 255 | 255 | 255 | 255 |
| 17 | 255 | 255 | 255 | 255 | 255 | 255 | 255 | 255 | 255 | 255 | 255 | 255 | 255 | 255 | 255 | 255 | 255 | 255 | 255 | 255 |
| 18 | 255 | 255 | 255 | 255 | 255 | 255 | 255 | 255 | 255 | 255 | 255 | 255 | 255 | 255 | 255 | 255 | 255 | 255 | 255 | 255 |
| 19 | 255 | 255 | 255 | 255 | 255 | 255 | 255 | 255 | 255 | 255 | 255 | 255 | 255 | 255 | 255 | 255 | 255 | 255 | 255 | 255 |
| 20 | 255 | 255 | 255 | 255 | 255 | 255 | 255 | 255 | 255 | 255 | 255 | 255 | 255 | 255 | 255 | 255 | 255 | 255 | 255 | 255 |

20 20  DILATE BY 1, THEN SCALE BY 1/2 X 2, WITH NEAREST NEIGHBOR

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 255 | 255 | 255 | 255 | 255 | 255 | 255 | 255 | 255 | 255 | 255 | 255 | 255 | 255 | 255 | 255 | 255 | 255 | 255 | 255 |
| 2 | 255 | 255 | 255 | 255 | 255 | 255 | 255 | 255 | 255 | 255 | 255 | 255 | 255 | 255 | 255 | 255 | 255 | 255 | 255 | 255 |
| 3 | 255 | 255 | 255 | 255 | 255 | 255 | 255 | 255 | 255 | 255 | 255 | 255 | 255 | 255 | 255 | 255 | 255 | 255 | 255 | 255 |
| 4 | 255 | 255 | 255 | 255 | 255 | 255 | 255 | 255 | 255 | 255 | 255 | 255 | 255 | 255 | 255 | 255 | 255 | 255 | 255 | 255 |
| 5 | 255 | 255 | 255 | 255 | 0 | 0 | 0 | 0 | 0 | 0 | 0 | 0 | 0 | 0 | 0 | 0 | 255 | 255 | 255 | 255 |
| 6 | 255 | 255 | 255 | 255 | 0 | 0 | 0 | 0 | 0 | 0 | 0 | 0 | 0 | 0 | 0 | 0 | 255 | 255 | 255 | 255 |
| 7 | 255 | 255 | 255 | 255 | 0 | 0 | 0 | 0 | 0 | 0 | 0 | 0 | 0 | 0 | 0 | 0 | 255 | 255 | 255 | 255 |
| 8 | 255 | 255 | 255 | 255 | 0 | 0 | 0 | 0 | 0 | 0 | 0 | 0 | 0 | 0 | 0 | 0 | 255 | 255 | 255 | 255 |
| 9 | 255 | 255 | 255 | 255 | 0 | 0 | 0 | 0 | 0 | 0 | 0 | 0 | 0 | 0 | 0 | 0 | 255 | 255 | 255 | 255 |
| 10 | 255 | 255 | 255 | 255 | 0 | 0 | 0 | 0 | 0 | 0 | 0 | 0 | 0 | 0 | 0 | 0 | 255 | 255 | 255 | 255 |
| 11 | 255 | 255 | 255 | 255 | 0 | 0 | 0 | 0 | 0 | 0 | 0 | 0 | 0 | 0 | 0 | 0 | 255 | 255 | 255 | 255 |
| 12 | 255 | 255 | 255 | 255 | 0 | 0 | 0 | 0 | 0 | 0 | 0 | 0 | 0 | 0 | 0 | 0 | 255 | 255 | 255 | 255 |
| 13 | 255 | 255 | 255 | 255 | 0 | 0 | 0 | 0 | 0 | 0 | 0 | 0 | 0 | 0 | 0 | 0 | 255 | 255 | 255 | 255 |
| 14 | 255 | 255 | 255 | 255 | 0 | 0 | 0 | 0 | 0 | 0 | 0 | 0 | 0 | 0 | 0 | 0 | 255 | 255 | 255 | 255 |
| 15 | 255 | 255 | 255 | 255 | 0 | 0 | 0 | 0 | 0 | 0 | 0 | 0 | 0 | 0 | 0 | 0 | 255 | 255 | 255 | 255 |
| 16 | 255 | 255 | 255 | 255 | 0 | 0 | 0 | 0 | 0 | 0 | 0 | 0 | 0 | 0 | 0 | 0 | 255 | 255 | 255 | 255 |
| 17 | 255 | 255 | 255 | 255 | 255 | 255 | 255 | 255 | 255 | 255 | 255 | 255 | 255 | 255 | 255 | 255 | 255 | 255 | 255 | 255 |
| 18 | 255 | 255 | 255 | 255 | 255 | 255 | 255 | 255 | 255 | 255 | 255 | 255 | 255 | 255 | 255 | 255 | 255 | 255 | 255 | 255 |
| 19 | 255 | 255 | 255 | 255 | 255 | 255 | 255 | 255 | 255 | 255 | 255 | 255 | 255 | 255 | 255 | 255 | 255 | 255 | 255 | 255 |
| 20 | 255 | 255 | 255 | 255 | 255 | 255 | 255 | 255 | 255 | 255 | 255 | 255 | 255 | 255 | 255 | 255 | 255 | 255 | 255 | 255 |

20 20    DILATE BY 1, THEN SCALE BY 1/2 X 2, WITH LINEAR INTERPOLATION

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 255 | 255 | 255 | 255 | 255 | 255 | 255 | 255 | 255 | 255 | 255 | 255 | 255 | 255 | 255 | 255 | 255 | 255 | 255 | 255 |
| 2 | 255 | 255 | 255 | 255 | 255 | 255 | 255 | 255 | 255 | 255 | 255 | 255 | 255 | 255 | 255 | 255 | 255 | 255 | 255 | 255 |
| 3 | 255 | 255 | 255 | 255 | 255 | 255 | 255 | 255 | 255 | 255 | 255 | 255 | 255 | 255 | 255 | 255 | 255 | 255 | 255 | 255 |
| 4 | 255 | 255 | 255 | 239 | 207 | 191 | 191 | 191 | 191 | 191 | 191 | 191 | 191 | 199 | 215 | 231 | 247 | 255 | 255 | 255 |
| 5 | 255 | 255 | 255 | 207 | 112 | 64 | 64 | 64 | 64 | 64 | 64 | 64 | 64 | 88 | 135 | 183 | 231 | 255 | 255 | 255 |
| 6 | 255 | 255 | 255 | 191 | 64 | 0 | 0 | 0 | 0 | 0 | 0 | 0 | 0 | 32 | 95 | 159 | 223 | 255 | 255 | 255 |
| 7 | 255 | 255 | 255 | 191 | 64 | 0 | 0 | 0 | 0 | 0 | 0 | 0 | 0 | 32 | 95 | 159 | 223 | 255 | 255 | 255 |
| 8 | 255 | 255 | 255 | 191 | 64 | 0 | 0 | 0 | 0 | 0 | 0 | 0 | 0 | 32 | 95 | 159 | 223 | 255 | 255 | 255 |
| 9 | 255 | 255 | 255 | 191 | 64 | 0 | 0 | 0 | 0 | 0 | 0 | 0 | 0 | 32 | 95 | 159 | 223 | 255 | 255 | 255 |
| 10 | 255 | 255 | 255 | 191 | 64 | 0 | 0 | 0 | 0 | 0 | 0 | 0 | 0 | 32 | 95 | 159 | 223 | 255 | 255 | 255 |
| 11 | 255 | 255 | 255 | 191 | 64 | 0 | 0 | 0 | 0 | 0 | 0 | 0 | 0 | 32 | 95 | 159 | 223 | 255 | 255 | 255 |
| 12 | 255 | 255 | 255 | 191 | 64 | 0 | 0 | 0 | 0 | 0 | 0 | 0 | 0 | 32 | 95 | 159 | 223 | 255 | 255 | 255 |
| 13 | 255 | 255 | 255 | 191 | 64 | 0 | 0 | 0 | 0 | 0 | 0 | 0 | 0 | 32 | 95 | 159 | 223 | 255 | 255 | 255 |
| 14 | 255 | 255 | 255 | 199 | 88 | 32 | 32 | 32 | 32 | 32 | 32 | 32 | 32 | 60 | 115 | 171 | 227 | 255 | 255 | 255 |
| 15 | 255 | 255 | 255 | 215 | 135 | 95 | 95 | 95 | 95 | 95 | 95 | 95 | 95 | 115 | 155 | 195 | 235 | 255 | 255 | 255 |
| 16 | 255 | 255 | 255 | 231 | 183 | 159 | 159 | 159 | 159 | 159 | 159 | 159 | 159 | 171 | 195 | 219 | 243 | 255 | 255 | 255 |
| 17 | 255 | 255 | 255 | 247 | 231 | 223 | 223 | 223 | 223 | 223 | 223 | 223 | 223 | 227 | 235 | 243 | 251 | 255 | 255 | 255 |
| 18 | 255 | 255 | 255 | 255 | 255 | 255 | 255 | 255 | 255 | 255 | 255 | 255 | 255 | 255 | 255 | 255 | 255 | 255 | 255 | 255 |
| 19 | 255 | 255 | 255 | 255 | 255 | 255 | 255 | 255 | 255 | 255 | 255 | 255 | 255 | 255 | 255 | 255 | 255 | 255 | 255 | 255 |
| 20 | 255 | 255 | 255 | 255 | 255 | 255 | 255 | 255 | 255 | 255 | 255 | 255 | 255 | 255 | 255 | 255 | 255 | 255 | 255 | 255 |

FIG. 3(f)

20 20                    DILATE ORIGINAL IMAGE BY 2

|    | 1 | 2 | 3 | 4 | 5 | 6 | 7 | 8 | 9 | 10 | 11 | 12 | 13 | 14 | 15 | 16 | 17 | 18 | 19 | 20 |
|----|---|---|---|---|---|---|---|---|---|----|----|----|----|----|----|----|----|----|----|----|
| 1  | 255 | 255 | 255 | 255 | 255 | 255 | 255 | 255 | 255 | 255 | 255 | 255 | 255 | 255 | 255 | 255 | 255 | 255 | 255 | 255 |
| 2  | 255 | 255 | 255 | 255 | 255 | 255 | 255 | 255 | 255 | 255 | 255 | 255 | 255 | 255 | 255 | 255 | 255 | 255 | 255 | 255 |
| 3  | 255 | 255 | 255 | 255 | 255 | 255 | 255 | 255 | 255 | 255 | 255 | 255 | 255 | 255 | 255 | 255 | 255 | 255 | 255 | 255 |
| 4  | 255 | 255 | 255 | 0 | 0 | 0 | 0 | 0 | 0 | 0 | 0 | 0 | 0 | 0 | 0 | 0 | 255 | 255 | 255 | 255 |
| 5  | 255 | 255 | 255 | 0 | 0 | 0 | 0 | 0 | 0 | 0 | 0 | 0 | 0 | 0 | 0 | 0 | 255 | 255 | 255 | 255 |
| 6  | 255 | 255 | 255 | 0 | 0 | 0 | 0 | 0 | 0 | 0 | 0 | 0 | 0 | 0 | 0 | 0 | 255 | 255 | 255 | 255 |
| 7  | 255 | 255 | 255 | 0 | 0 | 0 | 0 | 0 | 0 | 0 | 0 | 0 | 0 | 0 | 0 | 0 | 255 | 255 | 255 | 255 |
| 8  | 255 | 255 | 255 | 0 | 0 | 0 | 0 | 0 | 0 | 0 | 0 | 0 | 0 | 0 | 0 | 0 | 255 | 255 | 255 | 255 |
| 9  | 255 | 255 | 255 | 0 | 0 | 0 | 0 | 0 | 0 | 0 | 0 | 0 | 0 | 0 | 0 | 0 | 255 | 255 | 255 | 255 |
| 10 | 255 | 255 | 255 | 0 | 0 | 0 | 0 | 0 | 0 | 0 | 0 | 0 | 0 | 0 | 0 | 0 | 255 | 255 | 255 | 255 |
| 11 | 255 | 255 | 255 | 0 | 0 | 0 | 0 | 0 | 0 | 0 | 0 | 0 | 0 | 0 | 0 | 0 | 255 | 255 | 255 | 255 |
| 12 | 255 | 255 | 255 | 0 | 0 | 0 | 0 | 0 | 0 | 0 | 0 | 0 | 0 | 0 | 0 | 0 | 255 | 255 | 255 | 255 |
| 13 | 255 | 255 | 255 | 0 | 0 | 0 | 0 | 0 | 0 | 0 | 0 | 0 | 0 | 0 | 0 | 0 | 255 | 255 | 255 | 255 |
| 14 | 255 | 255 | 255 | 0 | 0 | 0 | 0 | 0 | 0 | 0 | 0 | 0 | 0 | 0 | 0 | 0 | 255 | 255 | 255 | 255 |
| 15 | 255 | 255 | 255 | 0 | 0 | 0 | 0 | 0 | 0 | 0 | 0 | 0 | 0 | 0 | 0 | 0 | 255 | 255 | 255 | 255 |
| 16 | 255 | 255 | 255 | 0 | 0 | 0 | 0 | 0 | 0 | 0 | 0 | 0 | 0 | 0 | 0 | 0 | 255 | 255 | 255 | 255 |
| 17 | 255 | 255 | 255 | 255 | 255 | 255 | 255 | 255 | 255 | 255 | 255 | 255 | 255 | 255 | 255 | 255 | 255 | 255 | 255 | 255 |
| 18 | 255 | 255 | 255 | 255 | 255 | 255 | 255 | 255 | 255 | 255 | 255 | 255 | 255 | 255 | 255 | 255 | 255 | 255 | 255 | 255 |
| 19 | 255 | 255 | 255 | 255 | 255 | 255 | 255 | 255 | 255 | 255 | 255 | 255 | 255 | 255 | 255 | 255 | 255 | 255 | 255 | 255 |
| 20 | 255 | 255 | 255 | 255 | 255 | 255 | 255 | 255 | 255 | 255 | 255 | 255 | 255 | 255 | 255 | 255 | 255 | 255 | 255 | 255 |

*FIG. 3(g)*

```
20 20    DILATE BY 2, THEN SCALE BY 1/2 X 2, WITH NEAREST NEIGHBOR
 1  255 255 255 255 255 255 255 255 255 255 255 255 255 255 255 255 255 255 255 255
 2  255 255 255 255 255 255 255 255 255 255 255 255 255 255 255 255 255 255 255 255
 3  255 255 255 255 255 255 255 255 255 255 255 255 255 255 255 255 255 255 255 255
 4  255 255 255 255 255 255 255 255 255 255 255 255 255 255 255 255 255 255 255 255
 5  255 255 255  0   0   0   0   0   0   0   0   0   0   0   0   0  255 255 255 255
 6  255 255 255  0   0   0   0   0   0   0   0   0   0   0   0   0  255 255 255 255
 7  255 255 255  0   0   0   0   0   0   0   0   0   0   0   0   0  255 255 255 255
 8  255 255 255  0   0   0   0   0   0   0   0   0   0   0   0   0  255 255 255 255
 9  255 255 255  0   0   0   0   0   0   0   0   0   0   0   0   0  255 255 255 255
10  255 255 255  0   0   0   0   0   0   0   0   0   0   0   0   0  255 255 255 255
11  255 255 255  0   0   0   0   0   0   0   0   0   0   0   0   0  255 255 255 255
12  255 255 255  0   0   0   0   0   0   0   0   0   0   0   0   0  255 255 255 255
13  255 255 255  0   0   0   0   0   0   0   0   0   0   0   0   0  255 255 255 255
14  255 255 255  0   0   0   0   0   0   0   0   0   0   0   0   0  255 255 255 255
15  255 255 255  0   0   0   0   0   0   0   0   0   0   0   0   0  255 255 255 255
16  255 255 255  0   0   0   0   0   0   0   0   0   0   0   0   0  255 255 255 255
17  255 255 255 255 255 255 255 255 255 255 255 255 255 255 255 255 255 255 255 255
18  255 255 255 255 255 255 255 255 255 255 255 255 255 255 255 255 255 255 255 255
19  255 255 255 255 255 255 255 255 255 255 255 255 255 255 255 255 255 255 255 255
20  255 255 255 255 255 255 255 255 255 255 255 255 255 255 255 255 255 255 255 255
     1   2   3   4   5   6   7   8   9  10  11  12  13  14  15  16  17  18  19  20
```

*FIG. 3(h)*

20 20  DILATE BY 2, THEN SCALE BY 1/2 X 2, WITH LINEAR INTERPOLATION

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 255 | 255 | 255 | 255 | 255 | 255 | 255 | 255 | 255 | 255 | 255 | 255 | 255 | 255 | 255 | 255 | 255 | 255 | 255 | 255 |
| 2 | 255 | 251 | 243 | 235 | 227 | 223 | 223 | 223 | 223 | 223 | 223 | 223 | 223 | 223 | 231 | 247 | 255 | 255 | 255 | 255 |
| 3 | 255 | 243 | 220 | 196 | 172 | 160 | 160 | 160 | 160 | 160 | 160 | 160 | 160 | 160 | 184 | 231 | 255 | 255 | 255 | 255 |
| 4 | 255 | 235 | 196 | 156 | 116 | 96 | 96 | 96 | 96 | 96 | 96 | 96 | 96 | 96 | 136 | 215 | 255 | 255 | 255 | 255 |
| 5 | 255 | 227 | 172 | 116 | 60 | 32 | 32 | 32 | 32 | 32 | 32 | 32 | 32 | 32 | 88 | 199 | 255 | 255 | 255 | 255 |
| 6 | 255 | 223 | 160 | 96 | 32 | 0 | 0 | 0 | 0 | 0 | 0 | 0 | 0 | 0 | 64 | 191 | 255 | 255 | 255 | 255 |
| 7 | 255 | 223 | 160 | 96 | 32 | 0 | 0 | 0 | 0 | 0 | 0 | 0 | 0 | 0 | 64 | 191 | 255 | 255 | 255 | 255 |
| 8 | 255 | 223 | 160 | 96 | 32 | 0 | 0 | 0 | 0 | 0 | 0 | 0 | 0 | 0 | 64 | 191 | 255 | 255 | 255 | 255 |
| 9 | 255 | 223 | 160 | 96 | 32 | 0 | 0 | 0 | 0 | 0 | 0 | 0 | 0 | 0 | 64 | 191 | 255 | 255 | 255 | 255 |
| 10 | 255 | 223 | 160 | 96 | 32 | 0 | 0 | 0 | 0 | 0 | 0 | 0 | 0 | 0 | 64 | 191 | 255 | 255 | 255 | 255 |
| 11 | 255 | 223 | 160 | 96 | 32 | 0 | 0 | 0 | 0 | 0 | 0 | 0 | 0 | 0 | 64 | 191 | 255 | 255 | 255 | 255 |
| 12 | 255 | 223 | 160 | 96 | 32 | 0 | 0 | 0 | 0 | 0 | 0 | 0 | 0 | 0 | 64 | 191 | 255 | 255 | 255 | 255 |
| 13 | 255 | 223 | 160 | 96 | 32 | 0 | 0 | 0 | 0 | 0 | 0 | 0 | 0 | 0 | 64 | 191 | 255 | 255 | 255 | 255 |
| 14 | 255 | 223 | 160 | 96 | 32 | 0 | 0 | 0 | 0 | 0 | 0 | 0 | 0 | 0 | 64 | 191 | 255 | 255 | 255 | 255 |
| 15 | 255 | 223 | 160 | 96 | 32 | 0 | 0 | 0 | 0 | 0 | 0 | 0 | 0 | 0 | 64 | 191 | 255 | 255 | 255 | 255 |
| 16 | 255 | 231 | 184 | 136 | 88 | 64 | 64 | 64 | 64 | 64 | 64 | 64 | 64 | 64 | 112 | 207 | 255 | 255 | 255 | 255 |
| 17 | 255 | 247 | 231 | 215 | 199 | 191 | 191 | 191 | 191 | 191 | 191 | 191 | 191 | 191 | 207 | 239 | 255 | 255 | 255 | 255 |
| 18 | 255 | 255 | 255 | 255 | 255 | 255 | 255 | 255 | 255 | 255 | 255 | 255 | 255 | 255 | 255 | 255 | 255 | 255 | 255 | 255 |
| 19 | 255 | 255 | 255 | 255 | 255 | 255 | 255 | 255 | 255 | 255 | 255 | 255 | 255 | 255 | 255 | 255 | 255 | 255 | 255 | 255 |
| 20 | 255 | 255 | 255 | 255 | 255 | 255 | 255 | 255 | 255 | 255 | 255 | 255 | 255 | 255 | 255 | 255 | 255 | 255 | 255 | 255 |

FIG. 3(i)

METHOD AND SYSTEM FOR COMPENSATING FOR SCALING ARTIFACTS IN MIXED RASTER CONTENT (MRC) REPRESENTATIONS

FIELD OF THE INVENTION

The present invention relates to digital imaging and more particularly to an image processing method to compensate for scaling artifacts in mixed raster content (MRC) representations of an image. The scaling artifacts resulting from interpolating into a discontinuity in the image representation are avoided by dilating a segment of the data representation of the image so that upon scaling reconstruction, there are additional pixels available for the interpolation operations and the reconstruction better matches the original image.

BACKGROUND OF THE PRESENT INVENTION

Digital image representations of composite documents, i.e., documents having text, pictures and graphics, e.g., photos, line-art and word print, are necessary and prevalent for communication, display or printing. The efficient handling and storage of such data representations is a continuing and universal concern. Accordingly, minimization of the space required of the data in digital imaging is always a designer's goal, not only for the reduction in storage size requirements, but also for expediting data communications. Data compression techniques for implementing such size reductions are well known and are typically utilized as much as possible to enhance system efficiencies.

One way of representing a composite document is with an MRC representation. Such a representation segments a document into selected portions usually based upon content so that one, or all of the segments can be reduced by a proper compression algorithm. With reference to FIG. 1, a three-plane layout of an MRC model for a composite document is illustrated. The composite document is seen to include a contone photograph in the lower plane 16 with surrounding text in the upper plane 12, in a document format that is well known to any magazine reader. The selector plane 14 in this model is a purely binary plane that switches between the upper and lower planes. The purpose of the segmenting is to permit the application of different compression techniques to the different segments according to their individual attributes. For instance, text and line-art data would be compressed with an approach that puts a high emphasis on maintaining the detail and structure of the input, while pictures would be compressed using an approach that puts a high emphasis on maintaining the smoothness and accuracy of the colors. This separation of the data by importance of content also suggests that it is advantageous to use different resolutions for the different data with a high spatial resolution used for text/line-art and a lower one for pictures. For instance, the resolution of the image layer containing background and pictures could be reduced by half prior to compression in order to achieve better compression ratio. Resolution reduction can be done by scaling algorithms, such as a "linear interpolation" algorithm or a "nearest neighbor" algorithm. The segmenting of a document into the lower and upper planes facilitates utilizing different and better resolution selections and compression techniques on the different layers in order to get higher compression ratios and more efficient digital representations of the document while maintaining acceptable image quality.

After an image has been compressed into a denser representation, that representation must be decompressed and where an MRC representation is used, the original image must be reconstructed from the decompressed layers. The resolution-reduced image layer should be scaled back up to the original resolution in this reconstruction process. The selector plane is merely a binary image for defining for a certain pixel which plane defines that pixel for the reconstruction process.

The undesirable artifacts that may occur in the reconstruction process, and that can be eliminated by the present invention, can be seen with reference to FIGS. 2(a), (b) and (c). FIG. 2(a) is the original image. FIG. 2(b) is a reconstructed image from an MRC file wherein the lower plane is scaled by one-half and then enlarged by two with a linear interpolation algorithm. FIG. 2(c) shows artifacts from a reconstructed image wherein the lower plane is scaled by one-half with a nearest neighbor algorithm. It is to be understood that scaled by one-half means that each of the two spatial dimensions are scaled by one-half resulting in an image that is one-quarter the size of the image prior to scaling. In both FIGS. 2(b) and 2(c) outline artifacts can be seen that are not contained in the original image.

FIGS. 3(a), (b) and (c) better illustrate how such artifacts can occur during scaling-down and scaling-up processes. Assume the image is a plane of a 9×9 pixel black box in a 20×20 square, wherein the boundary is white (i.e., pixel value is zero for full black, while pixel value 255 is full white). Assume the digital image representation of FIG. 3(a) is segmented into a mixed raster content similar to that shown in FIG. 1, with the 9×9 black box segmented to the lower plane. If, for resolution reduction purposes, the lower plane is scaled by one-half, then enlarged by two with a nearest neighbor technique, the reconstructed image will appear as is shown in FIG. 3(b). Therein, it can be seen that the black pixels have been reduced so that at the original boundary 30, white pixel values occur at row six and column six.

FIG. 3(c) illustrates what happens to the image of FIG. 3(a) when the lower plane is scaled by one-half, then enlarged by two with a linear interpolation technique. In this case, not only has the black central box shrunk in size, but also the edges have become more blurry and gray due to the resulting gradient in pixel values at the boundary line between the white and black values.

The illustrations in FIGS. 3(a) and 3(b) are unacceptable artifacts in certain situations for the reconstructed image. Although such artifacts are more readily apparent in a printing of the composite document, such artifacts can occur in other imaging apparatus (e.g., the electronic displays) where the scaling operation causes such modifications in the originally desired and intended pixel values.

Although such artifacts are demonstrated with reference to merely a three-plane MRC model, it can be appreciated that a plurality of planes may be used in the segmenting of the MRC model, all of which planes can be undesirably changed during scaling processes from the originally desired pixel values.

SUMMARY OF THE INVENTION

A first aspect of the present invention is a method for generating a data representation of a document for facilitating efficient compression of the representation without loss of document accuracy. The document is segregated into selected portions wherein a boundary defines at least one of the portions. The data representation within one of the portions that will be resolution reduced is dilated about the boundary. The dilated data representation then can be reduced before the selected compression technique is applied. When the reduced data representation is enlarged for reconstruction of the document, the portions can be combined for a more accurate reconstruction of the document. The dilating avoids artifacts normally imposed on the data representation by the resolution reduction and subsequent enlargement.

In accordance with a more limited aspect of the present invention, the segregating comprises segmenting the documents into a plurality of data types, wherein the types are associated with a particular compression method. A segment comprising a contone image is usually resolution reduced and compressed by linear interpolation or a nearest neighbor technique. Segmenting thus strives to segment the portions to parts of the document having more edge detail, i.e., text and line-arts, and parts having more smooth variations, i.e., pictures. The data representation preferably comprises a mixed raster content representation so that the segregating comprises forming a selector plane, an upper plane and a lower plane defining the segmented data representation portions of the document. The switch between the data types is defined by the selector plane. The dilating preferably comprises extending a value of the data representation by a pixel width or more in selected directions.

Another aspect of the present invention comprises an imaging system for eliminating undesired artifacts from an image attributable to scaling operations. The system includes means for representing the image as data. A segmentor distinguishes the data by type, and preferably as a plurality of segments in a mixed raster content format. A processor adjusts at least one of the segments to compensate for data loss expected from the scaling operations. Such compensation preferably comprises extending a value of a data representation to compensate for data loss expected during the scaling operation which usually corresponds to a document artifact apparent in the document after a reconstruction. The compressors compress the data accordingly based on the image attributes and the decompressors decompress the data. The scaler reduces the resolution of the data and an enlarger restores the data to the original resolution. An assembler combines the decompressed and restored data to form a reconstructed representation suitable for imaging.

In accordance with yet another aspect of the present invention, a method is provided for scaling a data representation of a document to compensate for possible artifacts wherein the data representation includes a plurality of segments comprising a document. One of the segments is dilated for forming additional data values for the segments whereby the scaling avoids engendering the possible artifacts attributable to data loss from the scaling. The dilating preferably comprises extending pixel values.

Further objects and advantages of the present invention will become apparent from the following descriptions of the various embodiments and characteristic features.

BRIEF DESCRIPTION OF THE DRAWINGS

The following are brief descriptions of each drawing used to describe the present invention, and thus, are being presented for illustration purposes only and should not be limitative of the scope of the present invention, wherein:

FIGS. 3(a)–3(i) are pixel value representations of an image, representing an original image, normal scaling operations of the original image, and resulting compensations made in accordance with the present invention; and, FIGS. 4(a) and 4(b) are block diagrams/flowcharts illustrating the steps practiced in accordance with the method of the subject invention.

DETAILED DESCRIPTION OF THE PREFERRED EMBODIMENTS

Figure 2A:
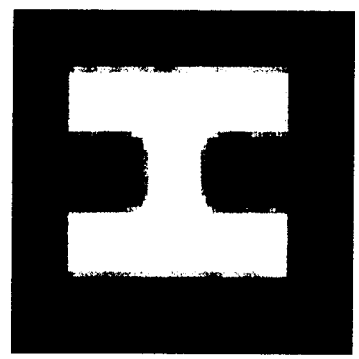
FIGS. 2(a)–2(e) are design images illustrating an original image, scaled and reconstructed artifacts resulting from normal scaling of the original image, and the changes in the image when compensating for the artifacts in accordance with the present invention.
Figure 2B:
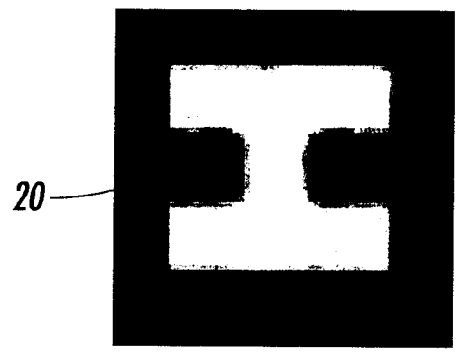
Figure 2C:
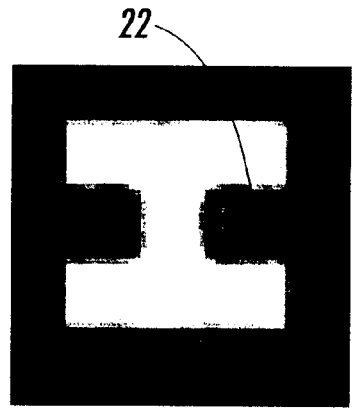

Referring now to the drawings where the showings are for purposes of illustrating preferred and alternative embodiments of the invention only and not for purposes of limiting same, the Figures show a method and system comprising an image processing technique for preventing the artifacts identified above when resolution reduction is involved in the constructing/reconstructing of the segments of an MRC file. Keeping in mind the need to reduce the resolution of one or more image layers in an MRC representation in order to achieve better compression ratios, the production of such smaller file sizes can have the consequence of generating unacceptable image quality for the reconstructed images made from the compressed files. In such situations (note FIGS. 2(b) and 2(c)) some artifacts 20, 22, that are not in the original image (FIG. 2(a)) can be introduced into the reconstructed images, due to the nature of the scaling algorithms. The subject invention comprises an image processing method for generating a resolution reduced or sub-sampled image which can be reconstructed such that the artifacts caused by the scaling are eliminated (FIGS. 2(d) and 2(e)).

Figure 1:
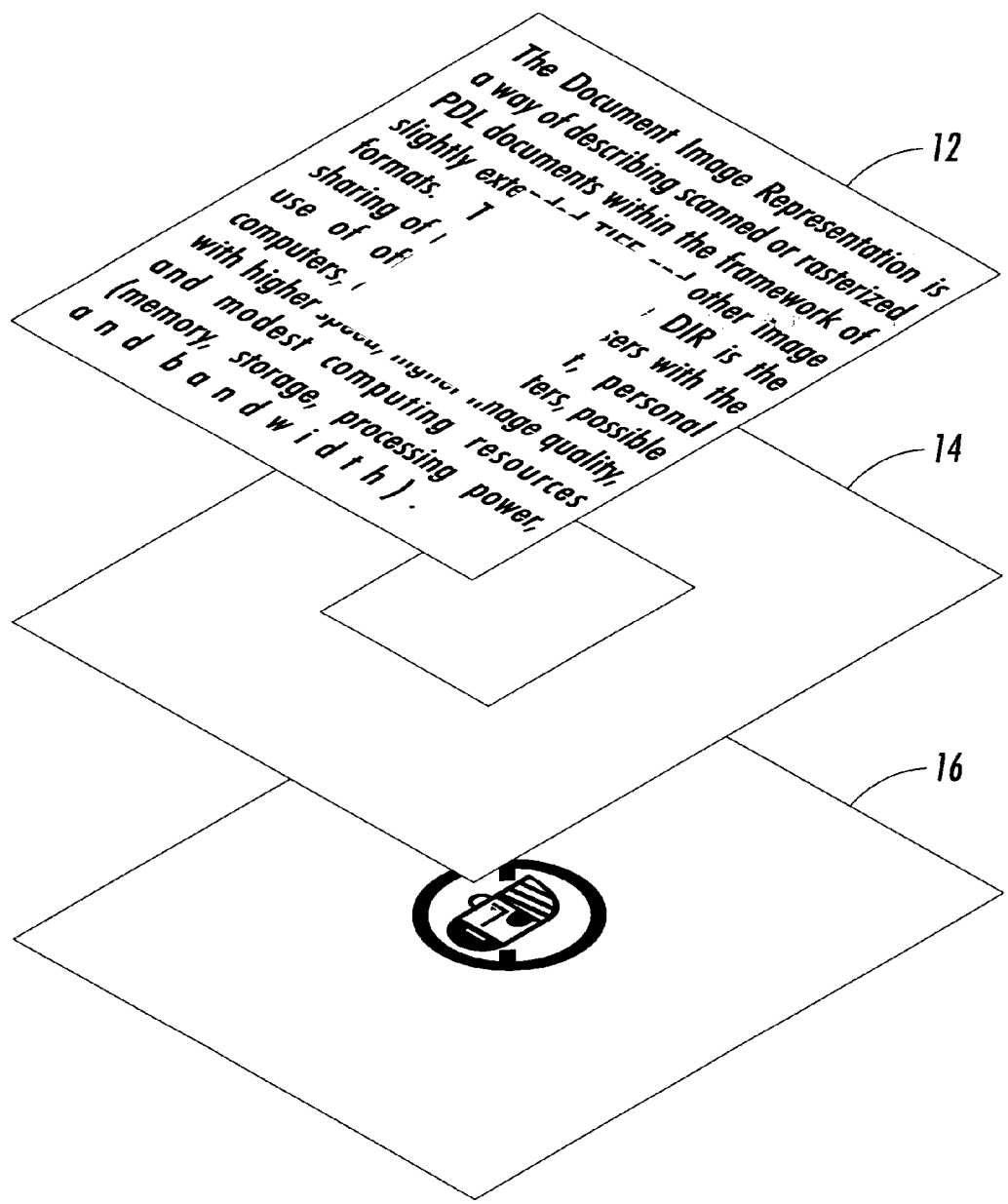
FIG. 1 shows a graphical representation of a three-plane layout of an MRC model.
Figure 4A:
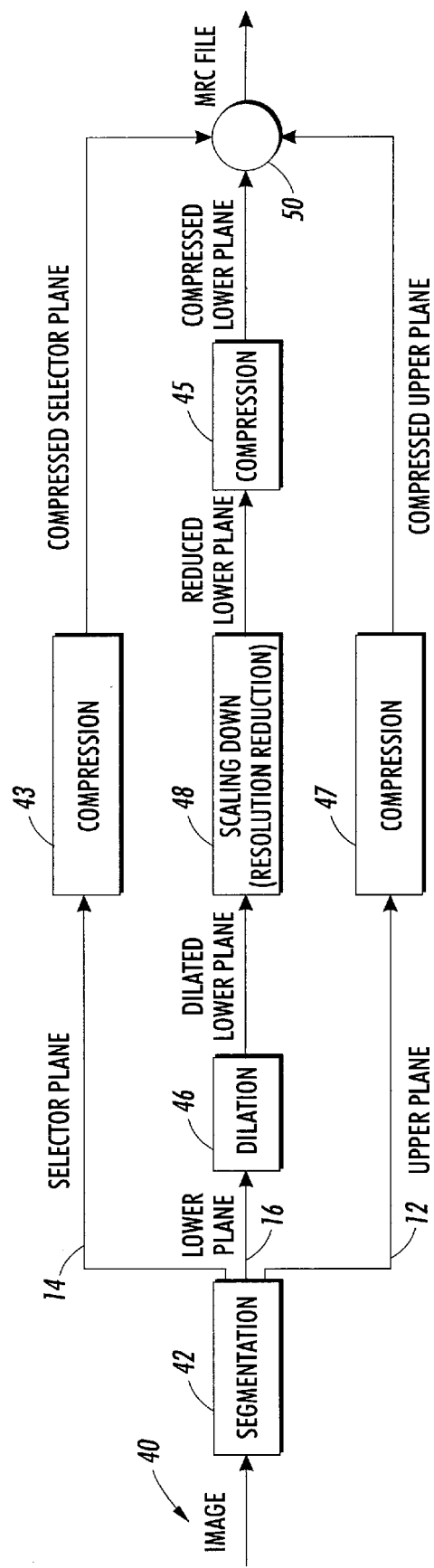
Figure 4B:
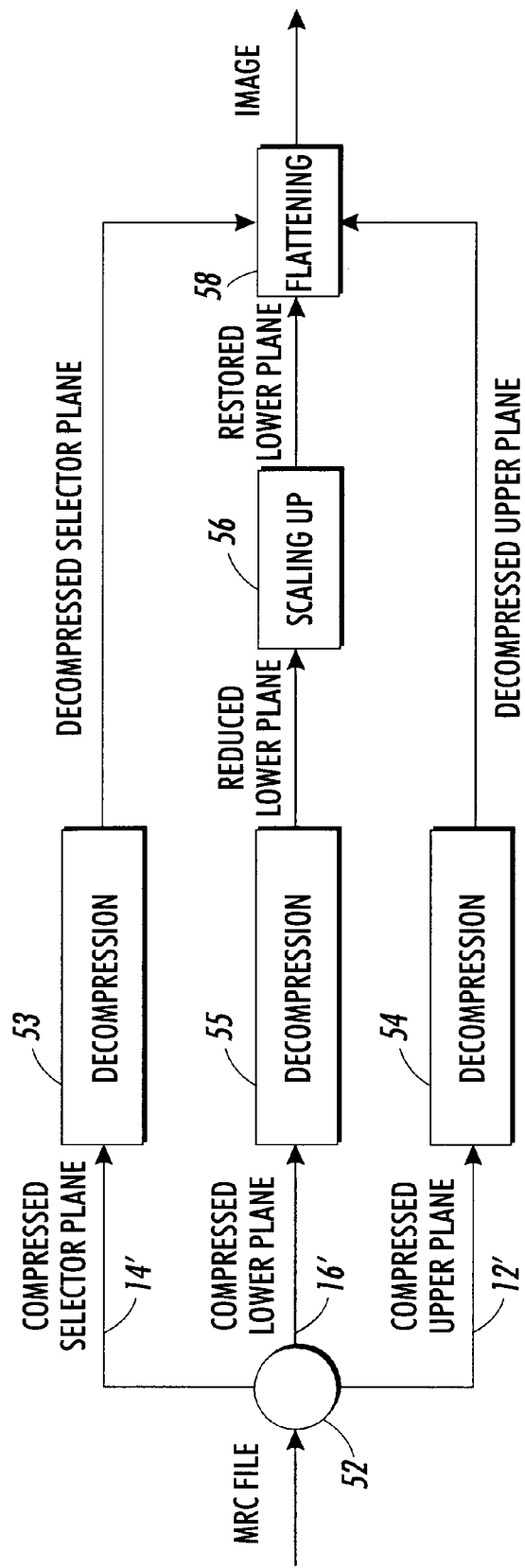

With particular reference to FIGS. 4(a) and 4(b), an image 40 such as can be computer generated, scanned, displayed or printed is converted into a data representation comprising a set of pixels having corresponding pixel values, as is well known in the art. FIG. 3(a) shows an original image comprising a 9×9 black box within a white frame (0 represents a pixel value of saturated black, while 255 represents a pixel value of white). The black box image is outlined in FIG. 3(a) by a boundary 30 merely representing where pixel values change from 0 to 255. A segmentor 42 can segregate the image 40 into selected portions distinguished at the boundary 30 to generate an MRC representation of the image in a manner as shown in FIG. 1. The selector plane 14 of FIG. 1 thus, for purposes of this explanation only, corresponds to where artifact correction needs to be made and the diagrams of FIG. 3 are intended to clarify the nature of the artifacts and their correction by the subject invention except in actuality the selector plane happens to be the original image or the inversion of the original image.

Although a three-plane black and white layout is presented here for purposes of illustrating the invention, it should be appreciated that other multi-plane layouts for an MRC model are possible. Similarly, the invention is just as applicable to color imaging as black and white.

To reduce the file size of the data representation of the MRC model, it is usually desirable to reduce the resolution through a sub-sampling technique of a segment comprising contone images. In the example of FIG. 1, the contone image is on the lower plane 16 while the text is on the upper plane 12. Although FIG. 1 and FIG. 3(a) are somewhat analogous, it will be appreciated that for simplicity purposes the pixel values within the boundary 30 are fixed but in reality they would be variable in accordance with the gray levels of the contone image. Continuing the analogy between FIGS. 1 and 3(a), the lower plane would contain the pixel data representations falling within the boundary 30, while the upper plane would contain the pixel value data representations falling outside the boundary 30. Of course, no such boundary 30 actually exists other than as the selector 14 operates as a selective binary plane that switches the pixel values in the reconstruction process between the upper and lower planes and thus merely defines the appropriate boundary between the upper plane 12 and the lower plane 16.

After appropriate segmentation into the MRC representation, a processor 46 will adjust the lower plane segment to compensate for data loss expected from the sub-sampling occurring in the scaling operation. The processing techniques for such scaling operations to reduce the data size of the image, like a "linear interpolation" algorithm or a "nearest neighbor" algorithm for reduction and enlargement, and like what compression schemes are selected (JPEG, JBIG, etc) for the compression and the decompression of the of the separate segments are well known in the art and for purposes of brevity are not described herein, as such methods are notorious and need not be explained to one of ordinary skill in the art. However, scaler 48 effects the appropriate resolution reduction of the lower plane data representations (i.e., the contone image) and compressors 43, 45, 47 compress the data through whatever compression technique is selected, for the ultimate reduction of the file size comprising the data representation of the pixel values for the planes 12, 14, 16.

The dilating processor 46 effects a change in the pixel values of the data representation as best can be illustrated by in FIGS. 3(d) and 3(g). In FIG. 3(d), the pixel value within the boundary 30 has been enlarged by extending the pixel data value "0" beyond the boundary 30 for one pixel in all four directions. Thus, for example, the pixel values that have been 255 in column 5, rows 5–15, have been adjusted to "0", the same pixel value of column 6, rows 6–14. Although in the preferred embodiment the pixel value extension occurs in all four sides of the boundary 30, it is within the scope of the invention to selectively repeat the value in not all the directions or in a plurality of pixel locations, or by differing amounts. FIG. 3(g) illustrates a dilation of the lower plane pixel data values by two locations in all dimensions.

After dilation, scaling and compression, all three planes 12, 14, 16 then can be combined 50 to form the MRC file suitable for storage or communication.

To reconstruct the image, the MRC file is segregated 52 into the compressed selected plane 14', upper plane 12' and lower plane 16'. Decompressors 53, 54, 55 respectively convert the files into decompressed data files. Enlarger 56 restores the reduced lower plane data by scaling up the data in response to whatever scaling algorithm was employed. As noted in FIGS. 2(b) and 2(c), such a reconstruction can cause artifacts. FIGS. 3(b) and 3(c) illustrate how such artifacts can occur. However, FIG. 3(e) illustrates the reconstructed original image of FIG. 3(d) after it had been dilated by one pixel value, scaled by one-half and enlarged by two with the nearest neighbor reconstruction algorithm, and shows that all the pixel values within the boundary 30 are restored to their intended and appropriate data value, "0". Similarly, FIG. 3(f) illustrates the original image which had been dilated by one, scaled by one-half, enlarged by two after compression utilizing an interpolation algorithm, has some artifacts at column 14 and row 14. FIG. 3(i) illustrates that if the dilation comprises replicating two pixel values, then these artifacts can also be removed. Accordingly, when a nearest neighbor reconstruction is employed, dilation by one pixel value in all dimensions is preferred, but when linear interpolation is selected, then dilation by two pixel values in all dimensions is preferred.

Figure 2D:
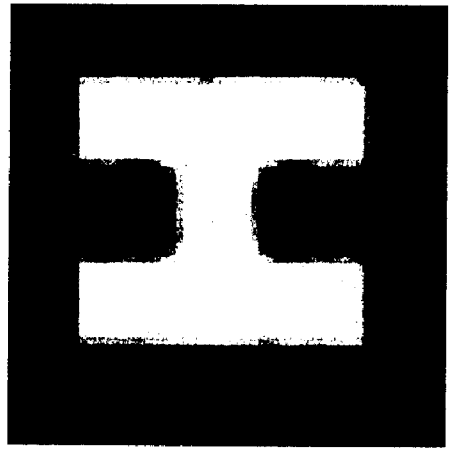
Figure 2E:
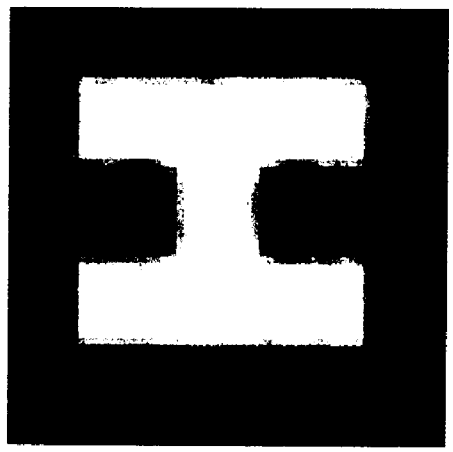

After scaling up by scaler 56, all the planes can be processed in assembler 58 to form a flattened reconstruction of the data representation of the document and the image can be converted to a form suitable for imaging or printing as desired. As can be seen with reference to FIGS. 3(e), 3(f), 3(h) and 3(i), enlarging of the data values extends the original image values beyond the imaginary boundary 30 so that the original image, FIG. 3(a), is now returned, at least as far as the lower plane is concerned. The purpose of the selector 14 is to mask such extended data values beyond the boundary 30 during the assembling process so that the reconstructed image comprises an assembly of only the appropriate data values within the boundary 30, while the data values from the upper plane 12 are selected as the pixel data values outside the boundary 30. Thus, the assembly operation will return a reconstructed image with no apparent artifacts. FIG. 2(d) illustrates a reconstructed image from an MRC file wherein the lower plane had been scaled by one-half and reconstructed with a linear interpolation algorithm, and FIG. 2(e) illustrates a reconstructed image where the upper plane has been scaled by one-half and restored with a nearest neighbor algorithm. Although in the example above the lower plane is the data representation that is scaled down, it is within the scope of the invention to alternately dilate and scale the upper plane, or dilate and scale all of the data planes within an MRC file.

It is also within the scope of the invention to dilate the lower plane mask instead of the lower plane data values. Such an alternative will work successfully in some special cases, depending upon the segmentation process and can be easy to implement especially in situations where the data values are merely binary, such as black and white image reconstruction.

In summary, the subject invention utilizes an MRC representation approach to reduce the data file size representing the image, while maintaining acceptable image quality. These goals are achieved by segmenting the image to be compressed into a part that has edge detail (text) and a part that varies smoothly (contones). Once the partitioning of the image has been performed, dilating of the image segment intended for reduction is performed, and the files are compressed by appropriate compression techniques. A selector plane is transmitted with the compressed image data to enable the combining of the two perhaps differently compressed sets of data. Importantly, before compression, dilation of data values is selectively applied to help prevent artifacts that would normally occur. Dilating fills in data values which would be absent due to sub-sampling with the data values for correct resealing.

While the present invention has been described with reference to various embodiments, it is not to be limited to the details set forth above, for it is intended to cover such modifications or changes as can be made within the scope of the attached claims.

Having thus described our invention, we now claim:

1. A method for generating a data representation of a document including the steps of:

generating a mixed raster content representation of the document;

segregating the document into selected portions;

dilating one of the selected portions;

scaling the dilated one portion compressing data representations of the selected portions;

decompressing the data representations; and, combining the portions whereby the dilating avoids artifacts normally imposed on the data representation by the scaling.

2. The method as defined in claim 1 wherein the segregating comprises segmenting the document into a plurality of data types, wherein the types are associated with a particular enlarging or compression method.

3. The method as defined in claim 2 wherein the types comprise a first portion having more edge detail and a second portion having more smooth variations.

4. The method as claimed in claim 2 wherein the dilating comprises extending pixel values beyond a boundary defining the one segment.

5. The method as claimed in claim 4 wherein the extending comprises one pixel in each dimension for a nearest neighbor reconstruction algorithim, and two pixels in each dimension for a linear interpolation reconstruction algorithm.

6. The method as claimed in claim 2 wherein the dilating comprises adjusting a mask defining the one segment.

7. The method as defined in claim 1 wherein the segregating comprises forming a selector plane, an upper plane and a lower plane and wherein a boundary is defined by the selector plane for identifying data values of the document from the upper and lower planes.

8. The method as defined in claim 7 wherein the dilating comprises expanding the data representation of the one portion.

9. The method as defined in claim 8 wherein the expanding comprises repeating a value of the data representation at the boundary by a pixel width in a selected direction.

10. The method as defined in claim 9 wherein the extending occurs about the entire boundary.

11. The method as defined in claim 7 wherein the combining is based on the selector plane for assembling the data representations corresponding to the upper plane and the lower plane for accurately forming the document regardless of any respective overlap generated in the dilating step.

12. The method as defined in claim 1 wherein the dilating comprises extending a value of a data representation to compensate for data loss occurring at the scaling step corresponding to a document artifact apparent in the document after the combining step.

13. An image processing method for inhibiting an artifact in a document engendered by a scaling operation, comprising steps of:

segmenting the document into a mixed raster content (MRC) data representation having segments distinguished by data type;

adjusting one of the segments in anticipatory compensation for data loss expected from the scaling operation and responsible for the artifact;

compressing the data;

enlarging the data representation for restoring the MRC data representation; and, combining the restored segments from the MRC data representation whereby the document may be imaged without the artifact.

14. The method as claimed in claim 13 wherein the adjusting comprises expanding data values about a periphery of the one segment beyond a selector mask of the MRC data representation.

15. The method as claimed in claim 14 wherein the expanding includes replicating a data value to dilate the one segment beyond a segment size determined by the selector mask.

16. The method as claimed in claim 15 wherein the replicating comprises repeating a data value for a pixel width in selected directions.

17. The method as claimed in claim 16 wherein the selected directions include the entire periphery.

18. An imaging system for eliminating an undesired artifact from an image attributable to scaling operations, comprising:

means for representing the image as data;

a segmentor for distinguishing the data by type as a plurality of segments in a mixed raster content format;

a processor for adjusting at least one of the segments to compensate for data loss expected from the scaling operations;

a scaler for reducing the data;

an enlarger for restoring the compressed data to the mixed raster content format; and, an assembler for combining the restored data to a form suitable for imaging.

19. The imaging system as claimed in claim 18 wherein the processor extends a value of the data beyond a boundary of the one segment whereby the extended value becomes available for resolution reduction by the scaler.

* * * * *